(12) United States Patent
Park

(10) Patent No.: US 9,771,072 B2
(45) Date of Patent: Sep. 26, 2017

(54) VEHICLE CONTROL SYSTEM AND METHOD FOR SELF-CONTROL DRIVING THEREOF

(71) Applicant: Hyundai Motor Company, Seoul (KR)

(72) Inventor: Kyun Sang Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 14/339,022

(22) Filed: Jul. 23, 2014

(65) Prior Publication Data

US 2015/0298694 A1 Oct. 22, 2015

(30) Foreign Application Priority Data

Apr. 16, 2014 (KR) ........................ 10-2014-0045538

(51) Int. Cl.
| | |
|---|---|
| *A01B 69/00* | (2006.01) |
| *B62D 6/00* | (2006.01) |
| *B62D 11/00* | (2006.01) |
| *B60W 30/12* | (2006.01) |
| *B60W 10/18* | (2012.01) |
| *B60W 10/20* | (2006.01) |
| *B60W 50/029* | (2012.01) |
| *B60W 10/04* | (2006.01) |
| *B60W 30/045* | (2012.01) |
| *B60W 30/16* | (2012.01) |

(52) U.S. Cl.
CPC ............ *B60W 30/12* (2013.01); *B60W 10/04* (2013.01); *B60W 10/18* (2013.01); *B60W 10/20* (2013.01); *B60W 30/045* (2013.01); *B60W 30/16* (2013.01); *B60W 50/029* (2013.01); *B60W 2520/14* (2013.01)

(58) Field of Classification Search
CPC ... B60T 8/1755; B62D 5/0463; B62D 5/0481; B60W 30/12; B60W 10/18; B60W 2510/207; B60G 2800/244
USPC ...................................................... 701/41, 70
See application file for complete search history.

(56) References Cited

U.S. PATENT DOCUMENTS

| | | | | |
|---|---|---|---|---|
| 2009/0088917 A1* | 4/2009 | Ross-Martin | .......... | B62D 9/002 701/23 |
| 2010/0211271 A1* | 8/2010 | Yasutake | ............... | B60T 8/1755 701/48 |
| 2012/0049617 A1* | 3/2012 | Furuyama | ............. | B60T 8/1766 303/9.75 |
| 2012/0277955 A1* | 11/2012 | Irie | ..................... | B60W 30/146 701/41 |

(Continued)

FOREIGN PATENT DOCUMENTS

| | | |
|---|---|---|
| JP | 2008-006857 A | 1/2008 |
| JP | 2009255666 A | * 11/2009 |

(Continued)

*Primary Examiner* — Isaac Smith
(74) *Attorney, Agent, or Firm* — Mintz Levin Cohn Ferris Glovsky and Popeo, P.C.; Peter F. Corless

(57) ABSTRACT

A vehicle control system and a method for self-control driving thereof are provided. The method includes: adjusting, by a controller, steering based on lane information and sensing a driving situation of the vehicle based on the steering adjustment. In addition, the controller is configured to determine an intervention in an attitude control based on the driving situation and in response to determining the intervention, operate a braking system to adjust the attitude of the vehicle.

16 Claims, 5 Drawing Sheets

(56) References Cited

U.S. PATENT DOCUMENTS

2012/0283907 A1* 11/2012 Lee .................... B60T 8/17557
701/31.9

FOREIGN PATENT DOCUMENTS

| | | |
|---|---|---|
| JP | 2011-213247 A | 10/2011 |
| KR | 10-2007-0095081 A | 9/2007 |
| KR | 100766596 B1 | 10/2007 |
| KR | 10-2011-0062440 A | 6/2011 |
| KR | 10-2011-0125282 A | 11/2011 |
| KR | 20120055013 A | 5/2012 |
| KR | 10-2012-0107663 A | 10/2012 |
| KR | 20130057191 A | 5/2013 |

* cited by examiner

VEHICLE CONTROL SYSTEM AND METHOD FOR SELF-CONTROL DRIVING THEREOF

CROSS-REFERENCE TO RELATED APPLICATION

This application is based on and claims the benefit of priority to Korean Patent Application No. 10-2014-0045538, filed on Apr. 16, 2014 in the Korean Intellectual Property Office, the disclosure of which is incorporated herein in its entirety by reference.

TECHNICAL FIELD

The present disclosure relates to a vehicle control system and a method for self-control driving thereof that improves stability and performance of a vehicle based on a cooperative control of a lane maintaining assist system and an electronic stability control (ESC).

BACKGROUND

Recently, as technology related to a smart vehicle has increased, attempts to add various functions to a vehicle have been developed to first achieve self-driving. Accordingly, a lane maintaining assist system (e.g., a system of maintaining a specific lane) shows sufficient performance within a range in which a lane is clear and various types of road conditions do not frequently occur, as in an express highway and therefore has widely used in vehicles. Further, an electronic stability control (ESC) maintains stability of a vehicle using a difference between an Ackermann yaw rate based on a steering angle and a current yaw rate to prevent instability of vehicle behaviors (e.g., under steer and over steer) within a critical situation.

The lane maintaining assist system according to the related art secures a stable section in which it may be operated only before the vehicle reaches the critical situation, and therefore may not lead to the maximum performance of the vehicle and may cause an oversteering situation. Further, the electronic stability control according to the related art determines a bank (e.g., an incline) angle using only a sensor of the vehicle and thus may have reduced determination reliability regarding whether the vehicle is driving on a bank road and has a limitation at a portion at which the critical situation at the bank road (e.g., an inclined or banked road) is sensed. Further, when a steering control system fails while the lane maintaining assist system and a smart cruise control are operated together, the related art outputs only a warning alarm for a driver to sense the situation but does not yet provide a method which may cope with the situation.

SUMMARY

The present disclosure provides a vehicle control system and a method for self-control driving thereof that may prevent oversteering from occurring by a cooperative control of a lane maintaining assist system and an electronic control system when a lane curvature and a critical curvature approach based on lane information approximate each other. In addition, the present disclosure provides a vehicle control system and a method for self-control driving thereof that may improve reliability of a determination result by determining whether a driving road is a bank road using lane information and steering angle information. Further, the present disclosure provides a vehicle control system and a method for self-control driving that may secure lane maintaining assist performance by a braking and driving control when a steering control system fails.

According to an exemplary embodiment of the present disclosure, a method for self-control driving of a vehicle control system may include: controlling, by a lane maintaining assist system, steering based on lane information; sensing, by an electronic stability control, a driving situation of the vehicle based on the steering control of the lane maintaining assist system; determining, by the electronic stability control, whether the electronic stability control intervenes in an attitude control based on the driving situation; and controlling, by the electronic stability control, a braking system based on the determination on whether the electronic stability control intervenes in the attitude control to adjust the attitude of the vehicle.

The controlling of the steering may include: acquiring, by the lane maintaining assist system, the lane information; calculating a steering angle for a steering wheel control using the lane information; and operating the steering system based on the calculated steering angle. In the process of monitoring of the driving situation, whether the vehicle is driving on a bank road may be determined based on a lane curvature and a vehicle curvature calculated using the lane information. In addition, in the process of the monitoring of the driving situation, whether the vehicle has oversteering possibility may be determined based on the lane curvature and a critical curvature using the lane information. Further, whether the steering system fails may be determined based on a fail flag received from the steering system. In the process of adjusting the attitude of the vehicle, the steering control may be requested to the lane maintaining assist system based on the bank when the vehicle is driving on the bank road.

The lane maintaining assist system may be configured to operate the steering system to measure a current yaw rate, modify a target yaw rate based on a difference between the measured yaw rate and the target yaw rate, and then adjust the steering based on the modified target yaw rate. In the process of adjusting the attitude of the vehicle, when the vehicle has oversteering possibility, braking torques of turning inside front and rear wheels may be calculated and the braking system may be operated based on the calculated braking torques. In addition, in response to sensing that the steering system fails, the braking system may be operated using lane departure angle information received from the lane maintaining assist system.

According to another exemplary embodiment of the present disclosure, a method for self-control driving of a vehicle control system may include: calculating, by the smart cruise control, a target driving torque to maintain an inter-vehicle distance from a front vehicle when a lane maintaining assist system and a smart cruise control are operated; performing an inter-vehicle distance maintaining function by operating a driving system using the target driving torque; sensing a failure of a steering system during the operation of the inter-vehicle distance maintaining function; calculating by the smart cruise control the target driving torque using a target braking torque; and operating the driving system using the target driving torque based on the target braking torque.

According to still another exemplary embodiment of the present disclosure, a vehicle control system may include: a lane maintaining assist system configured to acquire lane information and calculate a steering angle based on the lane information; a steering system configured to steer a steering wheel based on the steering wheel calculated by the lane maintaining assist system; and an electronic stability control configured to monitor a driving situation of the vehicle based on a control of the lane maintaining assist system, determine whether the electronic stability control intervenes in an attitude control based on the driving situation, and operate a braking system based on the determination.

The electronic stability control may be configured to determine whether the vehicle is driving on a bank road using a lane curvature and a vehicle curvature based on the lane information and in response to determining that the vehicle is driving on the bank road, request the lane maintaining assist system to adjust the steering in consideration of a bank. The lane maintaining assist system may be configured to operate the steering system to measure a current yaw rate, modify a target yaw rate based on a difference between the measured yaw rate and the target yaw rate, and then adjust the steering based on the modified target yaw rate.

The electronic stability control may be configured to determine whether the vehicle has oversteering possibility using a lane curvature and a critical curvature calculated based on the lane information and calculate braking torques of turning inside front and rear wheels using a difference between the critical curvature and the lane curvature when the oversteering possibility is present. The electronic stability control may be configured to determine whether the steering system fails based on a fail flag received from the steering system and in response to determining that the steering system fails, operate the braking system using lane departure angle information received from the lane maintaining assist system.

The vehicle control system may further include: a smart cruise control configured to calculate a target driving torque that corresponds to a target braking torque received from the electronic stability control in response to sensing that the steering system fails during the operation of the lane maintaining assist system together; and a driving system configured to generate a driving force based on the target driving torque calculated by the smart cruise control. The lane maintaining assist system may be configured to operate the steering system when the electronic stability control intervenes in the attitude control to maintain the steering angle of the steering wheel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present disclosure will be described with reference to the accompanying drawings.

Figure 1:
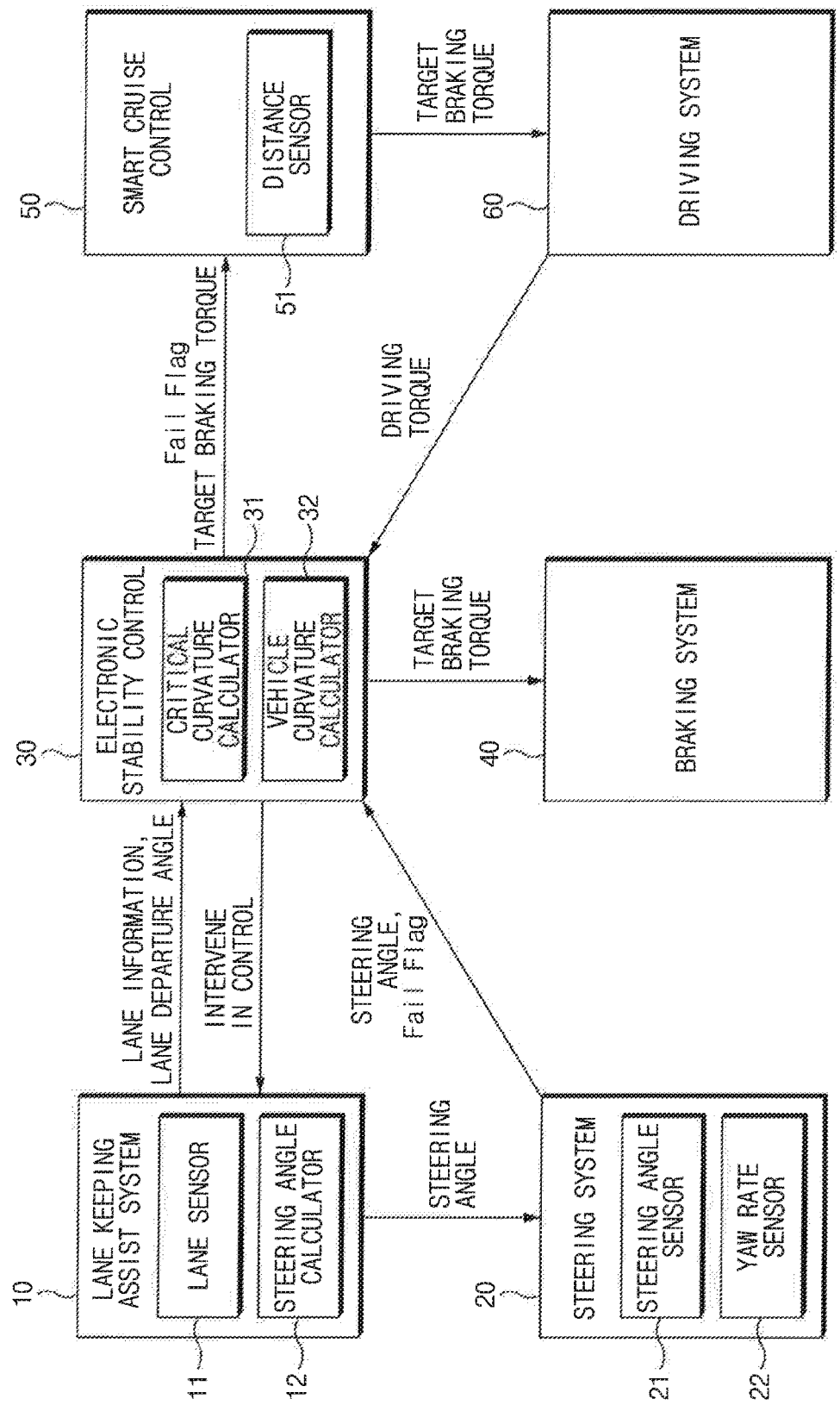
FIG. 1 is an exemplary block diagram of a vehicle control system according to an exemplary embodiment of the present disclosure.

FIG. 1 is an exemplary block diagram of a vehicle control system according to an exemplary embodiment of the present disclosure. Referring to FIG. 1, the vehicle control system according to the exemplary embodiment of the present disclosure may include a lane maintaining assist system (LKAS) 10, a steering system 20, an electronic stability control (ESC) 30, a brake system 40, a smart cruise control (SCC) 50, and a driving system 60. The lane maintaining assist system 10, the steering system 20, the electronic stability control 30, the brake system 40, the smart cruise control 50, and the driving system 60 may be executed by a controller having a processor and a memory. The controller may be configured to executed the operations of each one of the components.

In particular, the lane maintaining assist system 10 may be executed by a lane maintaining controller and may include a lane sensor 11 configured to sense a lane by an infrared sensor or an imaging device (e.g., a camera, video camera, or the like) and a steering angle calculator 12 configured to acquire lane information using the lane sensor 11 and calculate a steering angle for maintaining a lane using the lane information. The steering angle calculated by the steering angle calculator 12 may be used for a steering control. Further, the lane maintaining assist system 10 may be configured to calculate a lane departure angle using the lane information. The lane maintaining assist system 10 may be configured to transmit the lane information and the lane departure angle information to the electronic stability control 30.

The lane maintaining assist system 10 may be configured to determine whether to maintain a steering angle based on whether the electronic stability control 30 intervenes in an attitude control. When the electronic stability control 30 intervenes in the attitude control, the lane maintaining assist system 10 may be configured to operate the steering system 20 to maintain a current steering angle. Meanwhile, when the electronic stability control 30 does not intervene in the attitude control, the lane maintaining assist system 10 may be configured to operate the steering system 20 based on the steering angle calculated by the steering angle calculator 12. Further, when a vehicle is driving on a bank mad (e.g., an inclined mad), the lane maintaining assist system 10 may be configured to operate the steering in consideration of a bank.

The steering system 20 may be configured to receive the steering angle calculated by the steering angle calculator 12 of the lane maintaining assist system 10 and may be configured to adjust the steering angle of a steering wheel based on the calculated steering angle to steer a vehicle wheel. The steering system 20 may include a steering angle sensor 21 configured to measure the steering angle of the steering wheel. The steering angle sensor 21 may be configured to measure the steering angle of the steering wheel steered by the operation of the steering system 20. The steering system 20 may be executed by a steering controller to transmit the steering angle measured by the steering angle sensor 21 and a fail flag that includes information regarding whether the steering system 20 fails to the electronic stability control 30. The steering system 20 may be implemented as a motor driven power steering (MDPS). Further, the steering system 20 may include a yaw rate sensor 22 configured to measure a current yaw rate of a vehicle. The steering system 20 may be configured to calculate a difference between a yaw rate measured by the yaw rate sensor 22 when a vehicle is driving on a bank road and a target yaw rate and use the calculated difference to modify the target yaw rate. Additionally, the steering system 20 may be configured to adjust a steering of the steering wheel to implement the modified target yaw rate.

The electronic stability control 30 may be configured to receive the lane information and the lane departure angle from the lane maintaining assist system 10 and receive the steering angle and the fail flag from the steering system 20. The electronic stability control 30 may be executed by an electronic stability controller to monitor the driving situation of the vehicle using the lane information, the lane departure angle information, the steering angle, the fail flag, and the like received from the lane maintaining assist system 10 and the steering system 20. The electronic stability control 30 may include a critical curvature calculator 31 and a vehicle curvature calculator 32 both executed by the controller. The critical curvature calculator 31 may be configured to calculate a critical curvature $$\frac{1}{R_{limit}}$$

which is a curvature within a range in which a side slip angle is not diffused. The critical curvature $$\frac{1}{R_{limit}}$$

may be calculated using the following Equation 1.

$$|\gamma| = \frac{v_x}{R} \le \frac{|a_y|}{v_x} \Rightarrow \frac{1}{R} \le \frac{|a_y|}{v_x^2} \therefore \frac{1}{R_{limit}} = \frac{|a_y|}{v_x^2} \quad \text{Equation 1}$$

In the Equation 1, γ represents the yaw rate, R represents the yaw rate, $a_y$ represents a lateral acceleration, $v_x$ and represents a longitudinal velocity. The yaw rate, the lateral accelerator, and the longitudinal velocity may each be measured by the yaw rate sensor (not illustrated), a lateral accelerator sensor (not illustrated), and a longitudinal velocity sensor (not illustrated).

The vehicle curvature calculator 32 may be configured to calculate the vehicle curvature $$\frac{1}{R_{est}}$$

which is a curvature when a current vehicle rotates. The vehicle curvature $$\frac{1}{R_{est}}$$

may be calculated using the following Equation 2.

$$R_{est} = (l_f + l_r)\frac{\sin(90 - \delta - \alpha_f)}{\sin(\delta - \alpha_f - \alpha_r)} \quad \text{Equation 2}$$

In the above Equation 2, $l_f$ represents a distance between a center of gravity and a front wheel of the vehicle, $l_r$ represents the center of gravity and a rear wheel of the vehicle, δ represents the steering angle, $α_f$ represents the side slip angle of the front wheel, and $α_r$ represents the side slip angle of the rear wheel.

The electronic stability control 30 may be configured to determine whether the vehicle is being driven on the bank road based on the lane curvature and the vehicle curvature calculated based on the lane information. The electronic stability control 30 may further be configured to determine that the vehicle is being driven on the bank road when the difference |vehicle curvature−lane curvature| between the vehicle curvature and the lane curvature exceeds a threshold value and determine that the vehicle is driving on the bank road when the determination repeats a predetermined frequency.

The electronic stability control 30 may be configured to request the lane maintaining assist system 10 to operate the steering system 20 when a vehicle is being driven on the bank road. Therefore, when receiving a request of the bank compensation from the electronic stability control 30, the lane maintaining assist system 10 may be configured to recognize that the vehicle is being driven on the bank road to adjust the steering system 20. The steering system 20 may be configured to measure the current yaw rate by the yaw rate sensor 22 based on the operation of the lane maintaining assist system 10 and calculate the difference between the measured yaw rate and the target yaw rate as a compensation value (measured yaw rate−target yaw rate). Further, the steering system 20 may be configured to adjust (e.g., modify) the target yaw rate using the difference between the current yaw rate and the target yaw rate. In other words, modified target yaw rate=target yaw rate+(compensation value×compensation gain). Additionally, the steering system 20 may be configured to adjust the steering angle of the steering wheel to implement the modified target yaw rate.

When the difference |lane curvature−critical curvature| between the lane curvature R calculated by the lane information and the critical curvature calculated by the critical curvature calculator 31 is less than the threshold value, the electronic stability control 30 may be configured to determine that the vehicle wheel based on the operation of the lane maintaining assist system 10 approximates a steering limit. In other words, when the difference between the lane curvature and the critical curvature is less than the threshold value, the electronic stability control 30 may be configured to determine that the vehicle may be in an oversteering state. When the vehicle has the oversteering possibility, the electronic stability control 30 may be configured to calculate target braking torques of turning inside front and rear wheels respectively. In other words, a front inside target braking torque and a rear inside target braking torque may be represented by the following Equation 3.

Front wheel target braking torque=Front wheel gain×Compensation value

Rear wheel inside target braking torque=Rear wheel gain×Compensation value    Equation 3:

In the above Equation 3, compensation value=bound (|1/(critical curvature−lane curvature)|.

The electronic stability control 30 may be configured to operate the brake system 40 based on the target braking torque to generate a braking force. The electronic stability control 30 may be configured to determine whether the steering system 20 fails using the fail flag received from the steering system 20. In response to sensing a failure of the steering system 20, the electronic stability control 30 may be configured to operate the brake system 40 using the lane departure angle information. In other words, when the steering angle sensor 21 and/or the motor of the steering system 20 fail, the electronic stability control 30 may be configured to adjust the braking force of the vehicle wheel based on the lane exist angle information received from the lane maintaining assist system 10 to adjust the attitude of the vehicle.

The brake system 40 may be configured to generate the braking force based on the target braking torque output from the electronic stability control 30. The smart cruise control 50 may be executed by a smart cruise controller to receive the fail flag and the target braking torque from the electronic stability control 30 while being operated along with the lane maintaining assist system 10. The smart cruise control 50 may be configured to calculate the driving torque that corresponds to the target braking torque as the target driving torque. In other words, target driving torque=target driving torque+(gain×target braking torque). Further, the smart cruise control 50 may be configured to operate the driving system 60 based on the calculated target driving torque. The driving system 60 may be configured to generate the driving force that corresponds to the target driving torque based on the operation of the smart cruise control 50. The driving system 60 may be configured to transfer the generated driving torque information to the smart cruise control 30.

Figure 2:
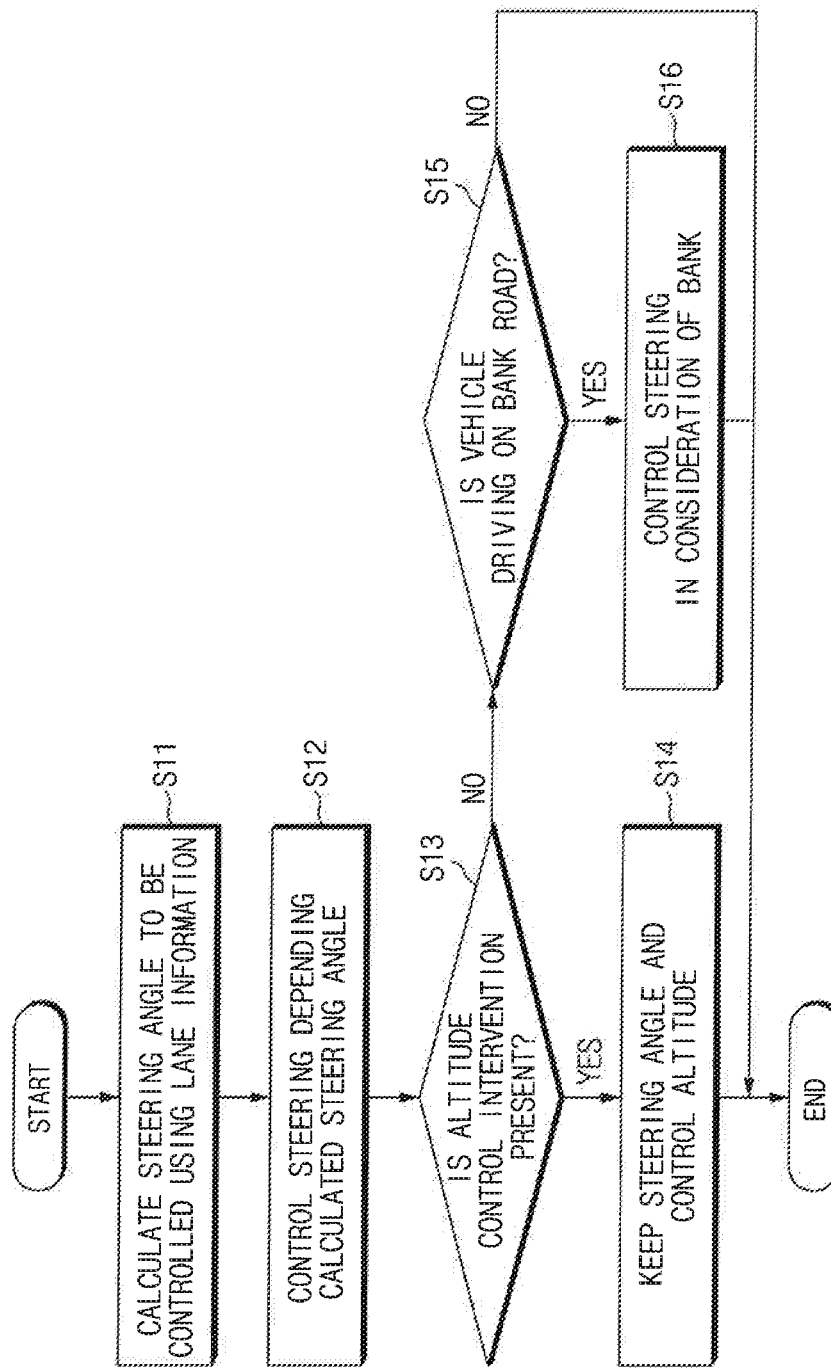
FIG. 2 is an exemplary flow chart illustrating an operation process of a lane maintaining assist system when the lane maintaining assist system and an electronic stability control according to the exemplary embodiment of the present disclosure are operated.

Hereinafter, a method for self-control driving method of the vehicle control system illustrated in FIG. 1 will be described in detail. FIG. 2 is an exemplary flow chart illustrating an operation process of the lane maintaining assist system when the lane maintaining assist system and the electronic stability control according to the exemplary embodiment of the present disclosure are operated.

First, the lane maintaining assist system 10 may be configured to acquire the lane information using the lane sensor 11 and calculate the steering angle for operating the steering wheel using the acquired lane information (S11). The lane maintaining assist system 10 may be configured adjust the steering of the steering wheel based on the calculated steering angle (S12). The lane maintaining assist system 10 being driven while maintaining the lane may also be configured to determine whether the electronic stability control 30 intervenes in the attitude control (S13). When the electronic stability control 30 intervenes in the attitude control, the lane maintaining assist system 10 may be configured to maintain the current steering angle of the steering wheel and permit the electronic stability control 30 to intervene in the attitude control (S14). Therefore, the electronic stability control 30 may be configured to perform the attitude control based on the driving situation of the vehicle.

Meanwhile, when the electronic stability control 30 does not intervene in the attitude control, the lane maintaining assist system 10 may be configured to determine whether the vehicle is being driven on the bank road (S15). In other words, the lane maintaining assist system 10 may be configured to determine whether the vehicle is being drive on the bank road (e.g., inclined road) based on the determination information on whether the electronic stability control 30 intervenes in the attitude control received from the electronic stability control 30. Further, when the vehicle is being driven on the bank road, the lane maintaining assist system 10 may be configured to adjust the steering based on the bank (e.g., incline) (S16). Herein, the steering system 20 may be executed by the controller to measure the current yaw rate by the yaw rate sensor 22 and modify the target yaw rate using the difference between the measured yaw rate and the target yaw rate. Further, the steering system 20 may be configured to adjust the steering angle of the steering wheel based on the modified target yaw rate.

Figure 3:
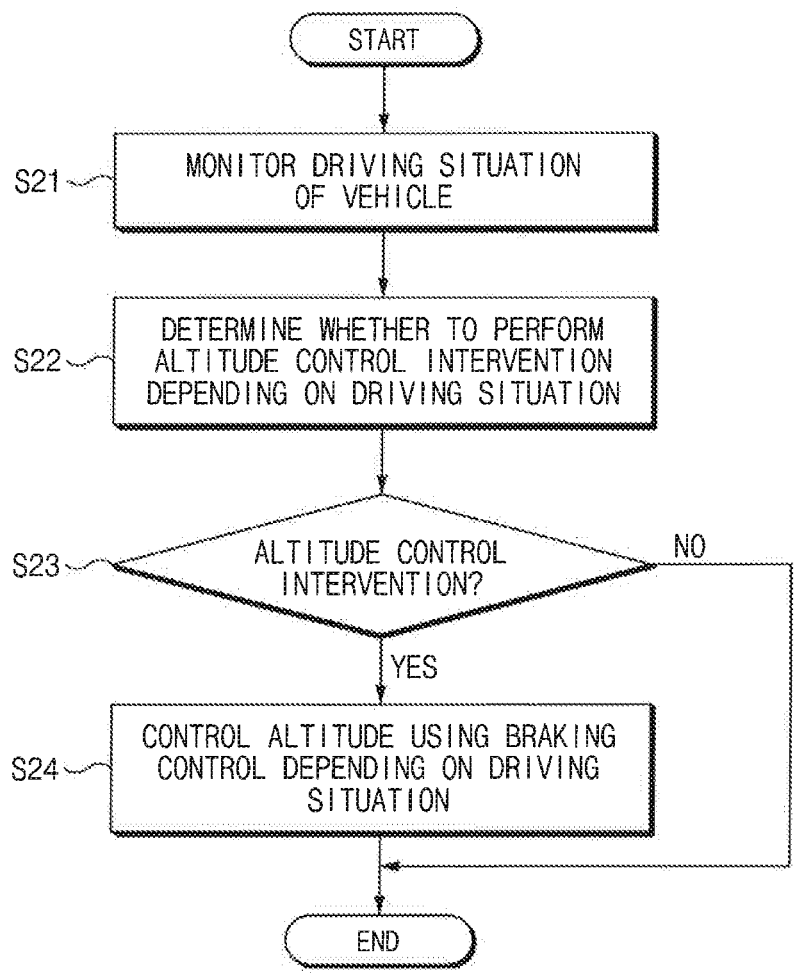
FIG. 3 is an exemplary flow chart illustrating an operation process of the electronic stability control when the lane maintaining assist system and the electronic stability control according to the exemplary embodiment of the present disclosure are operated.

FIG. 3 is an exemplary flow chart illustrating the operation process of the electronic stability control at the time of the operation of the lane maintaining assist system and the electronic stability control according to the exemplary embodiment of the present disclosure.

The electronic stability control 30 may be executed by the controller to monitor the driving situation of the driving vehicle. In particular, the electronic stability control 30 may be configured to receive the lane information and the lane departure angle from the lane maintaining assist system 10 and receive the steering angle and the fail flag from the steering system 20. Further, the electronic stability control 30 may be configured to monitor the driving situation of the vehicle based on the information received from the lane maintaining assist system 10 and the steering system 20. The electronic stability control 30 may further be configured to determine whether to intervene in the attitude control based on the driving situation of the vehicle (S22). Herein, the electronic stability control 30 may be configured to determine the driving situation of the vehicle to determine whether to intervene in the attitude control when the vehicle has the oversteering possibility or the steering system 20 fails. Meanwhile, the electronic stability control 30 may be configured to not perform the attitude control when the vehicle is being driven on the bank mad and may be configured to request the lane maintaining assist system 10 to adjust the steering in consideration of the bank (e.g., incline). In response to determining that the electronic stability control 30 intervenes in the attitude control, the electronic stability control 30 may be configured to operate the brake system 40 to adjust the attitude of the vehicle (S23 and S24).

Figure 4:
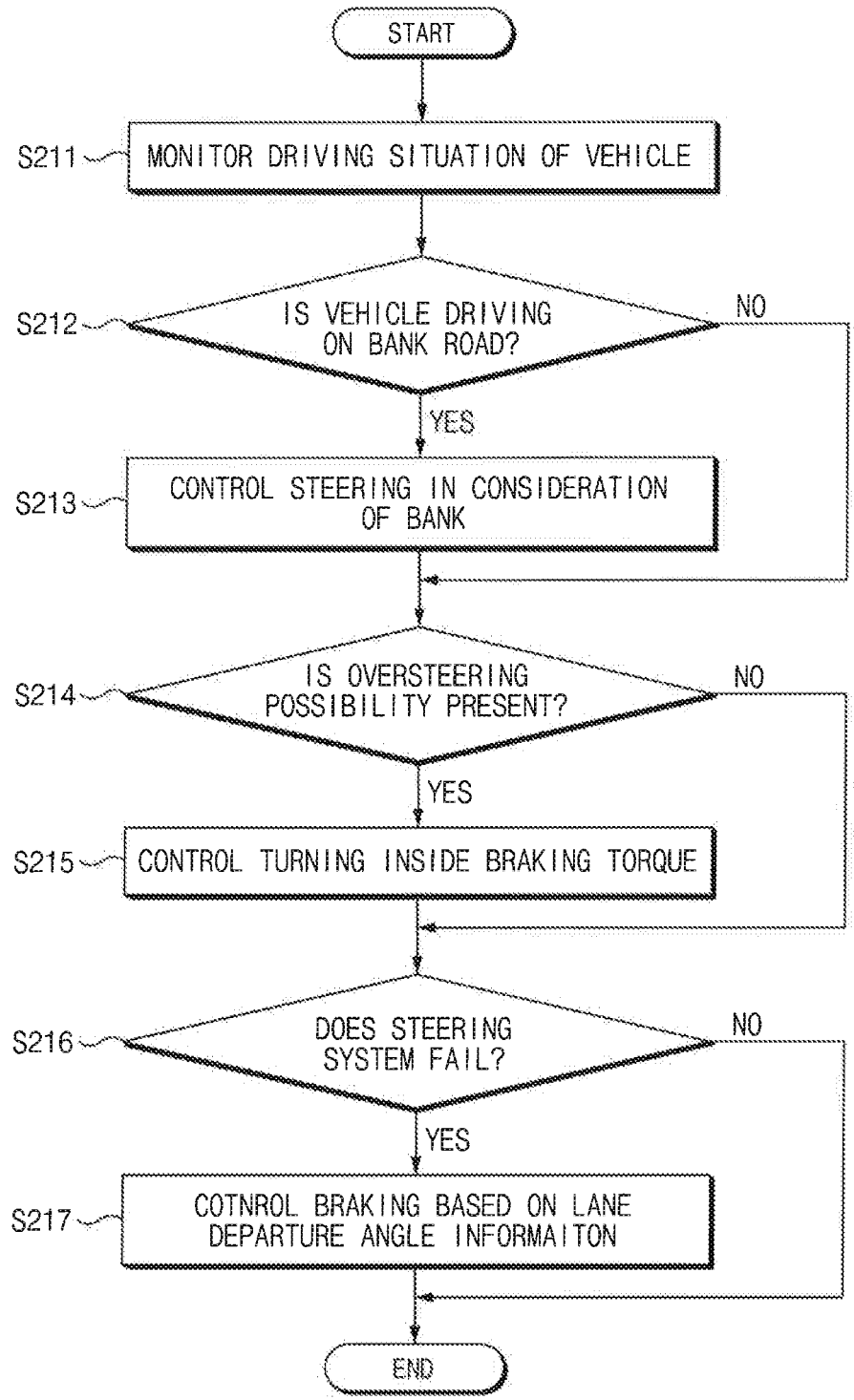
FIG. 4 is an exemplary flow chart illustrating an attitude control intervening method of the electronic stability control according to the exemplary embodiment of the present disclosure.

FIG. 4 is an exemplary flow chart illustrating an attitude control intervening method of the electronic stability control according to the exemplary embodiment of the present disclosure. As illustrated in FIG. 4, the electronic stability control 30 may be configured to monitor the driving situation of the vehicle which may be self-driving (e.g., may be driven autonomously) (S211). In particular, the electronic stability control 30 may be configured to determine whether the vehicle is being driven on the bank mad using the lane curvature and the vehicle curvature calculated based on the lane information and determine whether the vehicle has the oversteering possibility using the lane curvature and the critical curvature. Further, the electronic stability control 30 may be configured to sense whether the steering system 20 fails using the fail flag received from the steering system 20.

Moreover, when the vehicle is in a driving situation in which the vehicle is being driven on the bank road, the electronic stability control 30 may be configured to request the lane maintaining assist system to adjust the steering in consideration of the bank road (S212 and S213). In other words, the electronic stability control 30 may not intervene in the control of the lane maintaining assist system 10 and may be configured to permit the lane maintaining assist system 10 and the steering system 20 to be self-driven (e.g., driven autonomously) by the steering control. Further, the electronic stability control 30 may be configured to determine whether the vehicle has the oversteering possibility (S214).

When the determination result indicates that the vehicle may have an oversteering possibility, the electronic stability control 30 may be configured to calculate the turning inside braking torque using the difference between the critical curvature and the lane curvature and operate the braking system 40 based on the calculated braking torque (S215). Additionally, when the monitoring result of the driving situation indications that the steering system has failed, the electronic stability control 30 may be configured to operate the braking system 40 based on the lane departure angle information received from the lane maintaining assist system 10. In other words, the electronic stability control 30 may be configured to adjust the braking torque of the braking system 40 based on the lane departure angle information to prevent the vehicle from deviating out of the lane in which the vehicle is being driven.

Figure 5:
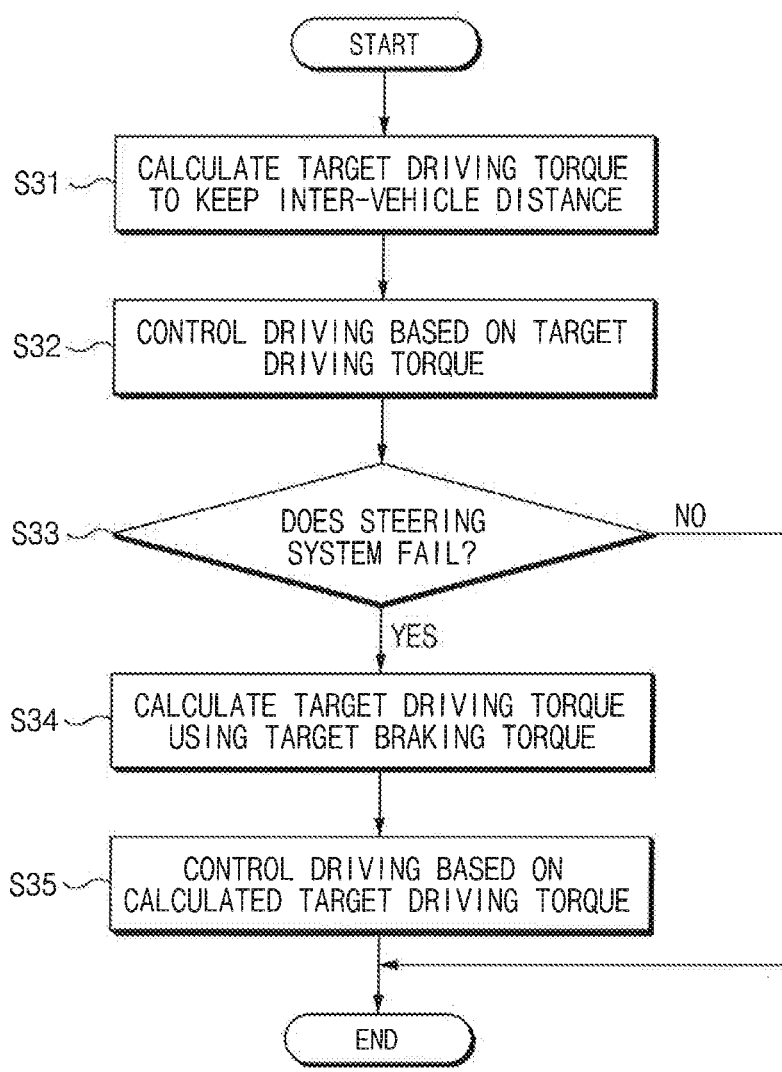
FIG. 5 is an exemplary flow chart illustrating an operation process of a smart cruise control when the lane maintaining assist system and the smart cruise control according to the exemplary embodiment of the present disclosure are operated.

FIG. 5 is an exemplary flow chart illustrating an operation process of a smart cruise control when a lane maintaining assist system and the smart cruise control according to another exemplary embodiment of the present disclosure are operated. First, the smart cruise control 50 may be configured to calculate the target driving torque to maintain the predetermined inter-vehicle distance from a front vehicle (e.g., a preceding vehicle) (S31). In particular, the smart cruise control 50 may be configured to measure the inter-vehicle distance from the front vehicle using a distance sensor 51 and calculate the target driving torque using the measured inter-vehicle distance.

The smart cruise control 50 may be executed by a smart cruise controller to operate the driving system 60 based on the calculated target driving torque to generate the driving force (S32). The vehicle may maintain the inter-vehicle distance based on the operation of the smart cruise control 50 and the smart cruise system 50 may be configured to determine whether the steering system 20 fails while the vehicle is being driven (S33). In particular, the smart cruise control 50 may be configured to determine whether the steering system 20 fails based on a fail flag received from the electronic stability control 30. In response to sensing that the steering system 20 has failed (e.g., a failure of the steering system 20), the smart cruise control 50 may be configured to calculate the target driving torque using the target braking torque received from the electronic stability control 30 (S34). The smart cruise control 50 may be configured to operate the driving system 60 using the target driving torque based on the target braking torque (S35).

As set forth above, according to the exemplary embodiments of the present disclosure, when the lane curvature and the critical curvature based on the lane information are about the same, it may be possible to prevent oversteering from occurring by the cooperative control of the lane maintaining assist system and the electronic stability control. Further, according to the exemplary embodiments of the present disclosure, it may be possible to improve the reliability of the determination result by determining whether the driving road is a bank road by using the lane information and the steering angle information. In addition, according to the embodiment of the present disclosure, when the steering control system fails, it may be possible to secure the lane maintaining assist performance by the braking and driving control.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present disclosure.

What is claimed is:

1. A method for self-control driving of a vehicle control system, comprising:
adjusting, by a controller, steering based on lane information;
sensing, by the controller, a driving situation of the vehicle based on the steering adjustment;
determining, by the controller, an intervention in an attitude control based on the driving situation; and operating, by the controller, a braking system based on determining the intervention in the attitude control to adjust the attitude of the vehicle,
wherein the sensing of the driving situation includes determining, by the controller, the vehicle is being driven on a bank road when a difference between a lane curvature and a vehicle curvature exceeds a first threshold value, and the vehicle curvature is a curvature when a current vehicle rotates, and
wherein the sensing of the driving situation includes determining, by the controller, there is an oversteering possibility when the difference between the lane curvature and a critical curvature using the lane information is less than a second threshold value, and the critical curvature is a curvature within a range in which a side slip angle is not diffused.

2. The method according to claim 1, wherein the adjusting of the steering includes:
acquiring, by the controller, the lane information;
calculating, by the controller, a steering angle for a steering wheel adjustment using the lane information; and
operating, by the controller, a steering system based on the calculated steering angle.

3. The method according to claim 1, wherein the monitoring of the driving situation includes:
determining, by the controller, whether a steering system fails based on a fail flag received from the steering system.

4. The method according to claim 1, wherein the adjusting of the attitude of the vehicle, includes:
adjusting, by the controller, the steering of the vehicle based on a bank when the vehicle is being driven on the bank road.

5. The method according to claim 4, further comprising:
measuring, by the controller, a current yaw rate;
modifying, by the controller, a target yaw rate based on a difference between the measured yaw rate and the target yaw rate; and
adjusting, by the controller, the steering based on the modified target yaw rate.

6. The method according to claim 1, wherein the adjusting of the attitude of the vehicle includes:
calculating, by the controller, braking torques of turning inside front and rear wheels in response to determining an oversteering possibility; and
operating, by the controller, the braking system based on the calculated braking torques.

7. The method according to claim 1, wherein the adjusting of the attitude of the vehicle includes:
operating, by the controller, the braking system using lane departure angle information in response to determining a failure of a steering system.

8. A vehicle control system, comprising:
a memory configured to store program instructions; and
a processor configured to execute the program instructions, the program instructions when executed configured to:
acquire lane information and calculate a steering angle based on the lane information;
adjust a steering wheel based on the calculated steering angle;
monitor a driving situation of the vehicle;
determine an intervention in an attitude control based on the driving situation; and
operate a braking system based on the intervention determination,
wherein the processor determines that the vehicle is being driven on a bank road when a difference between a lane curvature and a vehicle curvature exceeds a first threshold value, and the vehicle curvature is a curvature when a current vehicle rotates, and
wherein the processor determines that there is an oversteering possibility when the difference between the lane curvature and a critical curvature using the lane information is less than a second threshold value, and the critical curvature is a curvature within a range in which a side slip angle is not diffused.

9. The vehicle control system according to claim 8, wherein the program instructions when executed are further configured to:
in response to determining that the vehicle is being driven on the bank road, adjust the steering in consideration of a bank.

10. The vehicle control system according to claim 9, wherein the program instructions when executed are further configured to:
measure a current yaw rate, modify a target yaw rate based on a difference between the measured yaw rate and the target yaw rate; and
adjust the steering based on the modified target yaw rate.

11. The vehicle control system according to claim 8, wherein the program instructions when executed are further configured to:
calculate braking torques of turning inside front and rear wheels using a difference between the critical curvature and the lane curvature in response to determining the oversteering possibility.

12. The vehicle control system according to claim 8, wherein the program instructions when executed are further configured to:
determine whether there is a failure of a steering system based on a fail flag; and
in response to determining the failure of the steering system operate the braking system using lane departure angle information.

13. The vehicle control system according to claim 8, wherein the program instructions when executed are further configured to:
calculate a target driving torque that corresponds to a target braking torque in response to determining a failure of a steering system; and
generate a driving force based on the calculated target driving torque.

14. The vehicle control system according to claim 8, wherein the program instructions when executed are configured to operate a steering system in response to determining the intervention in the attitude control to maintain the steering angle of the steering wheel.

15. A non-transitory computer readable medium containing program instructions executed by a controller, the computer readable medium comprising:
program instructions that adjust steering based on lane information;
program instructions that sense a driving situation of the vehicle based on the steering adjustment;
program instructions that determine an intervention in an attitude control based on the driving situation; and
program instructions that operate a braking system based on determining the intervention in the attitude control to adjust the attitude of the vehicle,
wherein in the sensing of the driving situation, that the vehicle is being driven on a bank road is determined when a difference between a lane curvature and a vehicle curvature exceeds a first threshold value, and the vehicle curvature is a curvature when a current vehicle rotates, and wherein in the sensing of the driving situation, the program instructions determine that there is an oversteering possibility when the difference between the lane curvature and a critical curvature using the lane information is less than a second threshold value, and the critical curvature is a curvature within a range in which a side slip angle is not diffused.

16. The non-transitory computer readable medium of claim 15, further comprising:

program instructions that acquire the lane information;

program instructions that calculate a steering angle for a steering wheel adjustment using the lane information; and program instructions that operate a steering system based on the calculated steering angle.

* * * * *